United States Patent
Ha et al.

(10) Patent No.: US 8,319,920 B2
(45) Date of Patent: Nov. 27, 2012

(54) TRANSFLECTIVE LIQUID CRYSTAL DISPLAY DEVICE WITH TRANSMISSIVE PORTION HAVING RIGHT-ANGLED TRIANGLE SHAPE AND FABRICATING METHOD THEREOF

(75) Inventors: Kyoung-Su Ha, Seoul (KR); Mi-Sook Nam, Gunpo-si (KR); Su-Seok Choi, Hanam-si (KR); Sang-Min Jang, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 230 days.

(21) Appl. No.: 12/781,184

(22) Filed: May 17, 2010

(65) Prior Publication Data

US 2010/0225863 A1    Sep. 9, 2010

Related U.S. Application Data

(62) Division of application No. 10/747,062, filed on Dec. 30, 2003, now Pat. No. 7,742,133.

(30) Foreign Application Priority Data

Apr. 8, 2003 (KR) .............................. 2003-22049

(51) Int. Cl.
   *G02F 1/1335* (2006.01)
(52) U.S. Cl. ....................... 349/114; 349/113
(58) Field of Classification Search .......... 349/110–111, 349/113–114
   See application file for complete search history.

(56) References Cited

U.S. PATENT DOCUMENTS

| | | | |
|---|---|---|---|
| 6,195,140 B1 | 2/2001 | Kubo et al. | |
| 6,376,271 B1 | 4/2002 | Sawayama et al. | |
| 6,504,593 B1 | 1/2003 | Noritake et al. | |
| 6,812,978 B2 * | 11/2004 | Kim et al. | 349/106 |
| 6,853,421 B2 | 2/2005 | Sakamoto et al. | |
| 6,977,701 B2 * | 12/2005 | Murai et al. | 349/114 |
| 7,009,205 B2 | 3/2006 | Gotoh et al. | |
| 2002/0093609 A1 * | 7/2002 | Baek et al. | 349/113 |
| 2002/0113927 A1 | 8/2002 | Ha et al. | |
| 2003/0016322 A1 | 1/2003 | Ha et al. | |
| 2003/0030768 A1 | 2/2003 | Sakamoto et al. | |

(Continued)

FOREIGN PATENT DOCUMENTS

JP    11-101992    4/1999

(Continued)

*Primary Examiner* — Hoan C Nguyen
(74) *Attorney, Agent, or Firm* — McKenna, Long, and Aldridge, LLP.

(57) ABSTRACT

A transflective liquid crystal display device includes: first and second substrates facing and spaced apart from each other; a gate line on an inner surface of the first substrate; a data line crossing the gate line to define a pixel region including a reflective portion and a transmissive portion, wherein the transmissive portion has a polygonal shape inscribed in a rectangle, and a circumference of the transmissive portion is less than the circumference of the rectangle; a thin film transistor connected to the gate line and the data line; a passivation layer on the thin film transistor, the passivation layer having a opening corresponding to the transmissive portion; a reflective layer corresponding to the reflective portion on the passivation layer; a transparent electrode corresponding to the pixel region over the reflective layer; a color filter layer on an inner surface of the second substrate; a common electrode on the color filter layer; and a liquid crystal layer between the common electrode and the transparent electrode.

7 Claims, 18 Drawing Sheets

U.S. PATENT DOCUMENTS

| | | | |
|---|---|---|---|
| 2003/0076464 A1* | 4/2003 | Ozawa et al. | 349/113 |
| 2003/0081160 A1 | 5/2003 | Ihida et al. | |
| 2003/0156240 A1 | 8/2003 | Oda et al. | |
| 2003/0160920 A1 | 8/2003 | Ha et al. | |
| 2003/0206257 A1 | 11/2003 | Choi et al. | |
| 2004/0080684 A1* | 4/2004 | Rho | 349/106 |

FOREIGN PATENT DOCUMENTS

| | | |
|---|---|---|
| JP | 2000-019563 | 1/2000 |
| JP | 2000-267081 | 9/2000 |
| JP | 2000-30599 | 11/2000 |
| JP | 2001-42332 | 2/2001 |
| JP | 2002-287158 | 10/2002 |
| JP | 2002-296582 | 10/2002 |
| JP | 2002-350853 | 12/2002 |
| JP | 2003-050389 | 2/2003 |
| JP | 2003-172923 | 6/2003 |
| JP | 2003-270628 | 9/2003 |
| KR | 1020020010200 A | 2/2002 |
| KR | 1020030027676 A | 4/2003 |
| KR | 1020030027684 A | 4/2003 |

* cited by examiner

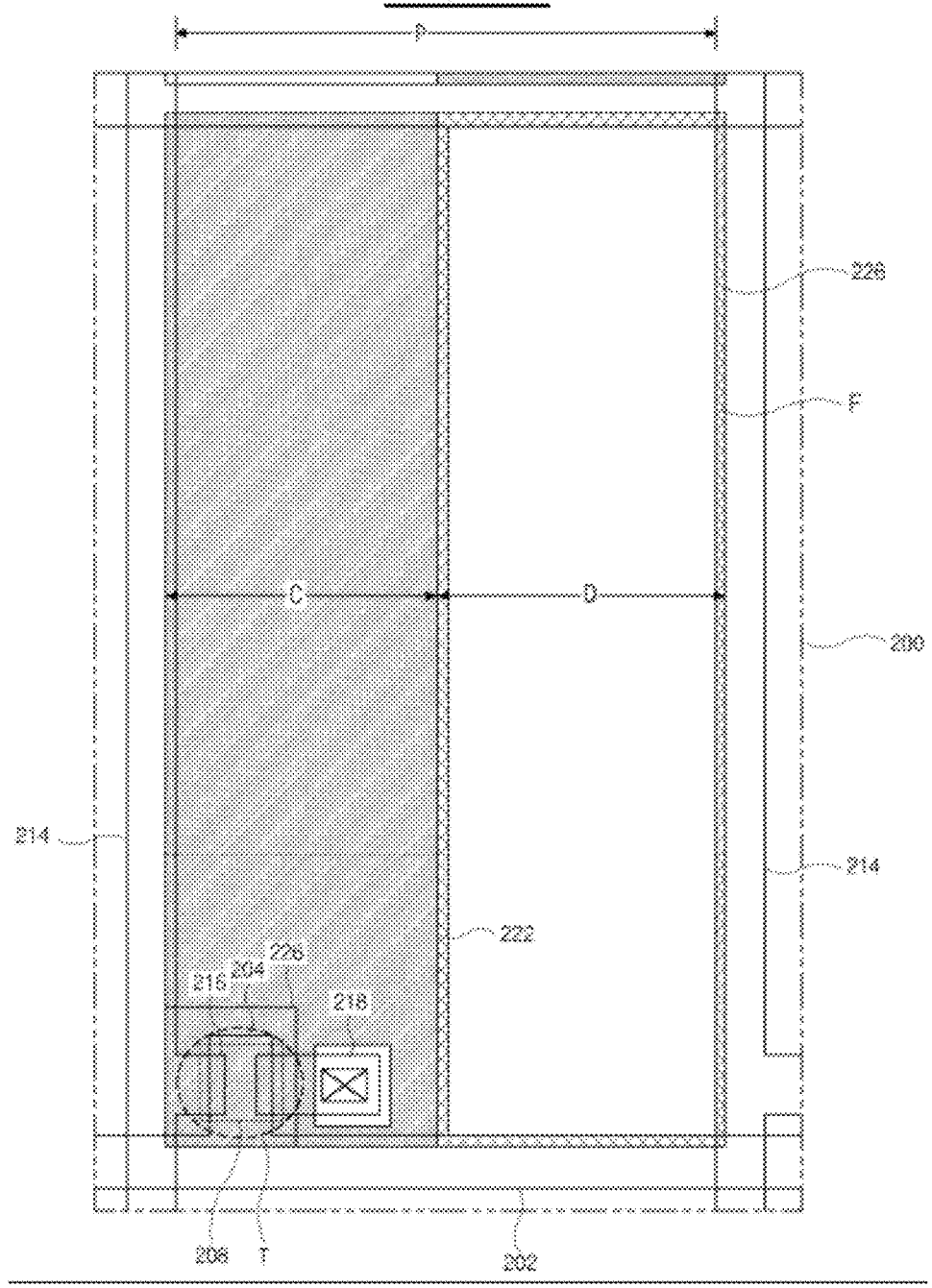

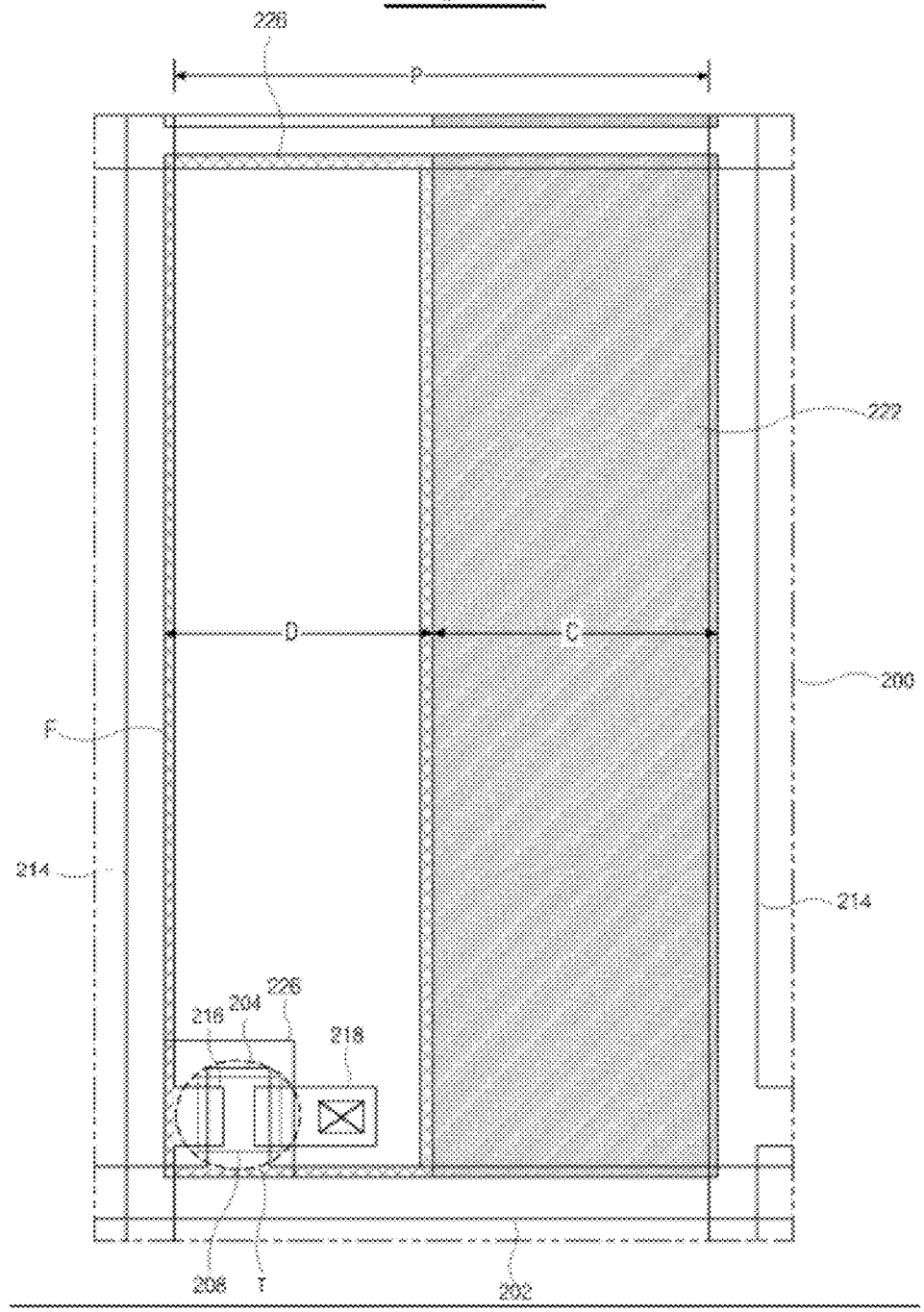

US 8,319,920 B2

TRANSFLECTIVE LIQUID CRYSTAL DISPLAY DEVICE WITH TRANSMISSIVE PORTION HAVING RIGHT-ANGLED TRIANGLE SHAPE AND FABRICATING METHOD THEREOF

This is a divisional application of U.S. patent application Ser. No. 10/747,062, filed on Dec. 30, 2003, now U.S. Pat. No. 7,742,133 which claims the benefit of Korean Patent Application No. 2003-22049, filed in Korea on Apr. 8, 2003, all of which are hereby incorporated by reference for all purposes as if fully set forth herein.

BACKGROUND OF THE INVENTION

1. Field of the Invention

The present invention relates to a liquid crystal display device, and more particularly, to a transflective liquid crystal display device selectively using reflective and transmissive modes and having equivalent light efficiency in reflective and transmissive portions with high brightness resulting from high aperture ratio, and a fabricating method thereof.

2. Discussion of the Related Art

Generally, transflective liquid crystal display (LCD) devices function as both transmissive and reflective LCD devices. Because transflective LCD devices can use both a backlight and natural or artificial ambient light, the transflective LCD devices may be used in more circumstances, and power consumption of transflective LCD devices may be reduced.

FIG. 1 is an exploded perspective view of a liquid crystal display (LCD) device according to the related art. As shown in FIG. 1, a liquid crystal display (LCD) device 10 has an upper substrate 80 having a black matrix 84, a color filter layer 82 including sub-color filters and a common electrode 86 on the color filter layer 82, and a lower substrate 60 having a thin film transistor (TFT) "T" and a pixel electrode 66 connected to the TFT "T." A liquid crystal layer 95 is interposed between the upper and lower substrates 80 and 60. The lower substrate 60 is referred to as an array substrate because array lines including a gate line 61 and a data line 62 are formed thereon. The gate line 61 and the data line 62 cross each other forming a matrix, and the TFT "T" of a switching element is connected to the gate line 61 and the data line 62. The gate line 61 and the data line 62 define a pixel region "P" by crossing each other, and the TFT "T" is formed near a crossing portion of the gate line 61 and the data line 62. The pixel electrode 66 is formed of a transparent conductive material such as indium-tin-oxide (ITO) and indium-zinc-oxide (IZO) in the pixel region "P." The upper substrate 80 is referred to as a color filter substrate because the color filter layer 82 is formed thereon.

A reflective electrode 64 of a reflective material such as aluminum (Al) or aluminum alloy is formed in the pixel region "P." The reflective electrode 64 has a transmissive hole "H" so that the pixel region "P" is divided into a reflective portion "C" and a transmissive portion "D." The transmissive portion "D" corresponds to the transmissive hole "H" and the reflective portion "C" corresponds to the reflective electrode 64.

FIGS. 2 and 3 are schematic cross-sectional views, which are taken along a line "II-II" of FIG. 1, showing a transflective liquid crystal display device according to first and second embodiments of the related art, respectively.

In FIG. 2, first and second substrates 60 and 80 face into and are spaced apart from each other and a liquid crystal layer 95 is interposed therebetween. The first and second substrates 60 and 80 include a plurality of pixel regions "P." A gate line (not shown) and a data 62 line crossing each other are formed on an inner surface of the first substrate 60. A color filter layer 82 including a red sub-color filter (not shown), a green sub-color filter 82a and a blue sub-color filter 82b is formed on an inner surface of the second substrate 80, and a black matrix 84 is formed between the sub-color filters 82a and 82b. A transparent common electrode 86 is formed on the color filter layer 82 and the black matrix 84.

The pixel region "P" may be divided into a reflective portion "C" and a transmissive portion "D." Generally, a transparent electrode 66 corresponding to the pixel region "P" is formed over an inner surface of the first substrate 60. A reflective electrode 64 having a transmissive hole "H" can be formed over or under the transparent electrode 66. The transmissive hole "H" corresponds to the transmissive portion "D" and the reflective electrode 64 corresponds to the reflective portion "C."

In a transflective LCD device, it is very important to obtain an equivalent optical efficiency and color reproducibility in the reflective and transmissive portions "C" and "D." In the reflective portion "C," light passes through the color filter layer 82 and the liquid crystal layer 95, and then reflects from the reflective electrode 64. The light reflecting from the reflective electrode 64 passes through the liquid crystal layer 95 and the color filter layer 82 again, and then is emitted to exterior. Accordingly, the light passes through the color filter layer 82 and the liquid crystal layer 95 having a thickness (i.e., a cell gap) "d" twice in the reflective portion "C." Because a first light path (a distance that light transverses) in the reflective portion "C" is twice that of a second light path in the transmissive portion "D," a first retardation value of 2d·Δn (n is a refractive index of the liquid crystal layer 95) in the reflective portion "C" is twice of a second retardation value of d·Δn in the transmissive portion "D." As a result, an equivalent optical efficiency is not obtained in the reflective and transmissive portions "C" and "D." To solve this problem, as shown in FIG. 3, a transflective LCD device having a cell gap ratio of 2d:d in transmissive and reflective portions has been suggested.

In FIG. 3, first and second substrates 60 and 80 face into and are spaced apart from each other and a liquid crystal layer 95 is interposed therebetween. The first and second substrates 60 and 80 include a plurality of pixel regions "P." A gate line (not shown) and a data 62 line crossing each other are formed on an inner surface of the first substrate 60. A color filter layer 82 including a red sub-color filter (not shown), a green sub-color filter 82a and a blue sub-color filter 82b is formed on an inner surface of the second substrate 80, and a black matrix 84 is formed between the sub-color filters 82a and 82b. A transparent common electrode 86 is formed on the color filter layer 82 and the black matrix 84.

The pixel region "P" may be divided into a reflective portion "C" and a transmissive portion "D." Generally, a transparent electrode 66 corresponding to the pixel region "P" is formed over an inner surface of the first substrate 60. A reflective electrode 64 having a transmissive hole "H" can be formed over or under the transparent electrode 66. The transmissive hole "H" corresponds to the transmissive portion "D" and the reflective electrode 64 corresponds to the reflective portion "C."

An insulating layer 63 having an opening 61 is formed under the reflective electrode 64. The opening 61 corresponds to the transmissive portion "D." The liquid crystal layer 95 is formed to have a thickness ratio (cell gap ratio) of 2d:d in the transmissive and reflective portions due to the opening 61, thereby an equivalent retardation value of 2d·Δn results in both in the reflective and transmissive portions "C" and "D."

However, the transflective LCD device of FIG. 3 has a disadvantage such as a disclination at a border of the reflective and transmissive portions "C" and "D." The disclination is illustrated in FIGS. 4 and 5.

FIG. 4 is a schematic plane view showing a pixel region of an array substrate for a transflective liquid crystal display device according to a second embodiment of the related art and FIG. 5 is a schematic cross-sectional view taken along a line "V-V" of FIG. 4.

In FIG. 4, a gate line 61 and a data line 62 crossing each other are formed on a substrate 60. An intersection of the gate line 61 and the data line 62 defines a pixel region "P". A thin film transistor (TFT) "T," including a gate electrode 70, an active layer 72, a source electrode 74 and a drain electrode 76, is formed at the intersection of the gate line 61 and the data line 62. The pixel region "P" is divided into a reflective portion "C" and a transmissive portion "D." A transparent electrode 66 is formed to correspond to the pixel region "P" and a reflective electrode 64 is formed to correspond to the reflective portion "C." The reflective electrode 64 has a transmissive hole corresponding to the transmissive portion "D." To obtain an equivalent optical efficiency in the reflective and transmissive portions "C" and "D," an insulating layer (not shown) is formed under the reflective electrode 64 to have a opening (not shown) corresponding to the transmissive portion "D." Accordingly, a step is generated at a border region "F" of the reflective and transmissive portions "C" and "D" and the step causes an incline.

In FIG. 5, a border region "F," where an incline is observed, includes a first width "F1" including a slanted surface of an insulating layer 63 and a second width "F2" extending from the slanted surface. The insulating layer 63 has a thickness of t and the slanted surface has an angle of $\theta$ with respect to a top surface of the substrate 60. When the thickness is about 2 μm and the angle is about 50°, the first width "F1" may be calculated from $F1 = t/\tan\theta \approx 1.7$ μm. Because the second width "F2" is generally about 1.5 μm, a total width of the border region "F" is about 3.2 μm.

Referring again to FIG. 4, a total area "A" of the border region "F" may be calculated from $A \approx 2 \times (L+W) \times 3.2$ μm$^2$, where L and W are a length and a width of the transmissive portion "D." As the transmissive portion "D" increases, the border region "F" where an incline is observed increases. Accordingly, the aperture ratio is degraded by about 10% and the degradation of aperture ratio causes a reduction in contrast ratio.

SUMMARY OF THE INVENTION

Accordingly, the present invention is directed to a transflective liquid crystal display device and a fabricating method thereof that substantially obviates one or more of the problems due to limitations and disadvantages of the related art.

An object of the present invention is to provide a transflective liquid crystal display device where aperture ratio, brightness and contrast ratio are improved by reducing the incline region and a fabricating method thereof.

An advantage of the present invention is to provide a transflective liquid crystal display device where the incline is improved by reducing a border region between the reflective and transmissive portions and a fabricating method thereof.

Another advantage of the present invention is to provide a transflective liquid crystal display device where the incline is improved by shielding the border region with either a gate line or a data line and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes: first and second substrates facing and spaced apart from each other; a gate line on an inner surface of the first substrate; a data line crossing the gate line to define a pixel region including a reflective portion and a transmissive portion, wherein the transmissive portion has a polygonal shape inscribed in a rectangle, and a circumference of the transmissive portion is less than a circumference of the rectangle; a thin film transistor connected to the gate line and the data line; a passivation layer on the thin film transistor, the passivation layer having a opening corresponding to the transmissive portion; a reflective layer corresponding to the reflective portion on the passivation layer; a transparent electrode corresponding to the pixel region over the reflective layer; a color filter layer on an inner surface of the second substrate; a common electrode on the color filter layer; and a liquid crystal layer between the common electrode and the transparent electrode.

In another aspect, a transflective liquid crystal display device includes: first and second substrates facing and spaced apart from each other; a gate line on an inner surface of the first substrate; a data line crossing the gate line to define a pixel region including a reflective portion and a transmissive portion, wherein the transmissive portion has a polygonal shape inscribed in a rectangle, and a circumference of the transmissive portion is less than the circumference of the rectangle; a thin film transistor connected to the gate line and the data line; a passivation layer on the thin film transistor; a reflective layer corresponding to the reflective portion on the passivation layer; a transparent electrode corresponding to the pixel region over the reflective layer; a buffer layer corresponding to the reflective portion on an inner surface of the second substrate; a color filter layer on the buffer layer; a common electrode on the color filter layer; and a liquid crystal layer between the common electrode and the transparent electrode.

In another aspect, a transflective liquid crystal display device includes: first and second substrates facing and spaced apart from each other; a plurality of gate lines on an inner surface of the first substrate; a plurality of data lines crossing the gate lines to define pixel regions including a reflective portion and a transmissive portion, wherein a border region between the reflective and transmissive portion overlaps one of the gate lines and the data lines; a thin film transistor connected to the gate line and the data line; a passivation layer on the thin film transistor, the passivation layer having a opening corresponding to the transmissive portion; a reflective layer corresponding to the reflective portion on the passivation layer; a transparent electrode corresponding to the pixel region over the reflective layer; a color filter layer on an inner surface of the second substrate; a common electrode on the color filter layer; and a liquid crystal layer between the common electrode and the transparent electrode.

In another aspect, a transflective liquid crystal display device includes: first and second substrates facing and spaced apart from each other; a plurality of gate lines on an inner surface of the first substrate; a plurality of data lines crossing the gate lines to define pixel regions including a reflective portion and a transmissive portion, wherein a border region between the reflective and transmissive portion overlaps one of the gate lines and the data lines; a thin film transistor connected to the gate line and the data line; a passivation layer on the thin film transistor; a reflective layer corresponding to the reflective portion on the passivation layer; a transparent electrode corresponding to the pixel region over the reflective layer; a buffer layer corresponding to the reflective portion on an inner surface of the second substrate; a color filter layer on the buffer layer; a common electrode on the color filter layer; and a liquid crystal layer between the common electrode and the transparent electrode.

In another aspect, a method of fabricating a transflective liquid crystal display device includes: forming a gate line on an a first substrate; forming a data line crossing the gate line to define a pixel region including a reflective portion and a transmissive portion, wherein a border region between the reflective and transmissive portion overlaps one of the gate line and the data line; forming a thin film transistor connected to the gate line and the data line; forming a first passivation layer on the thin film transistor, the first passivation layer including an inorganic material; forming a second passivation layer on the first passivation layer, the second passivation layer having a opening corresponding to the transmissive portion and including an organic material; forming a reflective layer corresponding to the reflective portion on the second passivation layer; forming a third passivation layer on the reflective layer; forming a transparent electrode corresponding to the pixel region on the third passivation layer; forming a color filter layer on a second substrate; forming a common electrode on the color filter layer; attaching the first and second substrates such that the common electrode faces the transparent electrode; and forming a liquid crystal layer between the common electrode and the transparent electrode.

In another aspect, a fabricating method of a transflective liquid crystal display device includes: forming a gate line on a first substrate; forming a data line crossing the gate line to define a pixel region including a reflective portion and a transmissive portion, wherein a border region between the reflective and transmissive portion overlaps one of the gate line and the data line; forming a thin film transistor connected to the gate line and the data line; forming a first passivation layer on the thin film transistor, the first passivation layer having a opening corresponding to the transmissive portion and including an organic material; forming a second passivation layer on the first passivation layer; forming a reflective layer corresponding to the reflective portion on the second passivation layer; forming a third passivation layer on the reflective layer; forming a transparent electrode corresponding to the pixel region on the third passivation layer; forming a buffer layer corresponding to the reflective portion on a second substrate; forming a color filter layer on the buffer layer; forming a common electrode on the color filter layer; attaching the first and second substrates such that the common electrode faces the transparent electrode; and forming a liquid crystal layer between the common electrode and the transparent electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 17 is a schematic cross-sectional view showing a pixel region of an array substrate for a transflective liquid crystal display device according to a twelfth embodiment of the present invention; and FIG. 18 is a schematic cross-sectional view showing a pixel region of an array substrate for a transflective liquid crystal display device according to a thirteenth embodiment of the present invention.

DETAILED DESCRIPTION OF THE ILLUSTRATED EMBODIMENTS

Reference will now be made in detail to embodiments of the present invention, examples of which are illustrated in the accompanying drawings.

Figure 6:
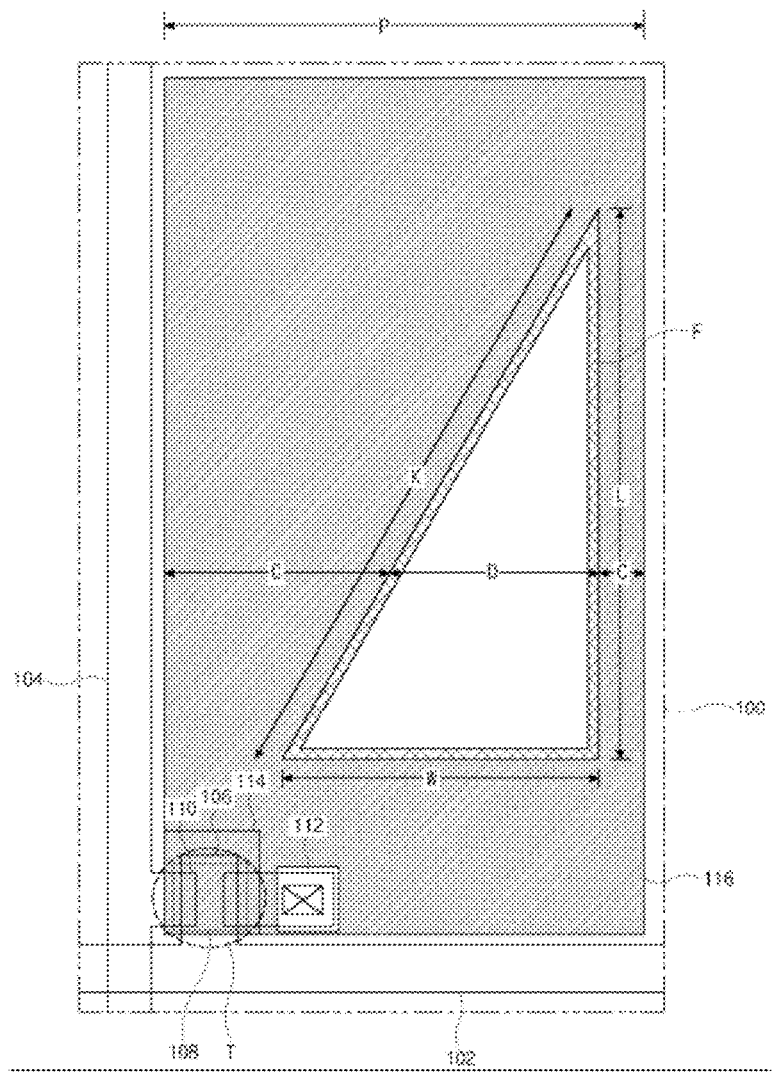
FIG. 6 is a schematic plane view showing a pixel region of an array substrate for a transflective liquid crystal display device according to a first embodiment of the present invention.

FIG. 6 is a schematic plane view showing a pixel region of an array substrate for a transflective liquid crystal display device according to a first embodiment of the present invention.

In FIG. 6, a gate line 102 is formed on a substrate 100 and a data line 104 crosses the gate line 102 to define a pixel region "P." A thin film transistor (TFT) "T" including a gate electrode 106, an active layer 108, a source electrode 110 and a drain electrode 112 is connected to the gate line 102 and the data line 104. The gate electrode 106 and the source electrode 110 are connected to the gate line 102 and the data line 104, respectively. The source and drain electrodes 110 and 112 are spaced apart from each other. The pixel region "P" includes a reflective portion "C" and a transmissive portion "D." A transparent electrode 114 is formed to correspond to the pixel region "P" and a reflective layer 116 is formed to correspond to the reflective portion "C."

Figure 1:
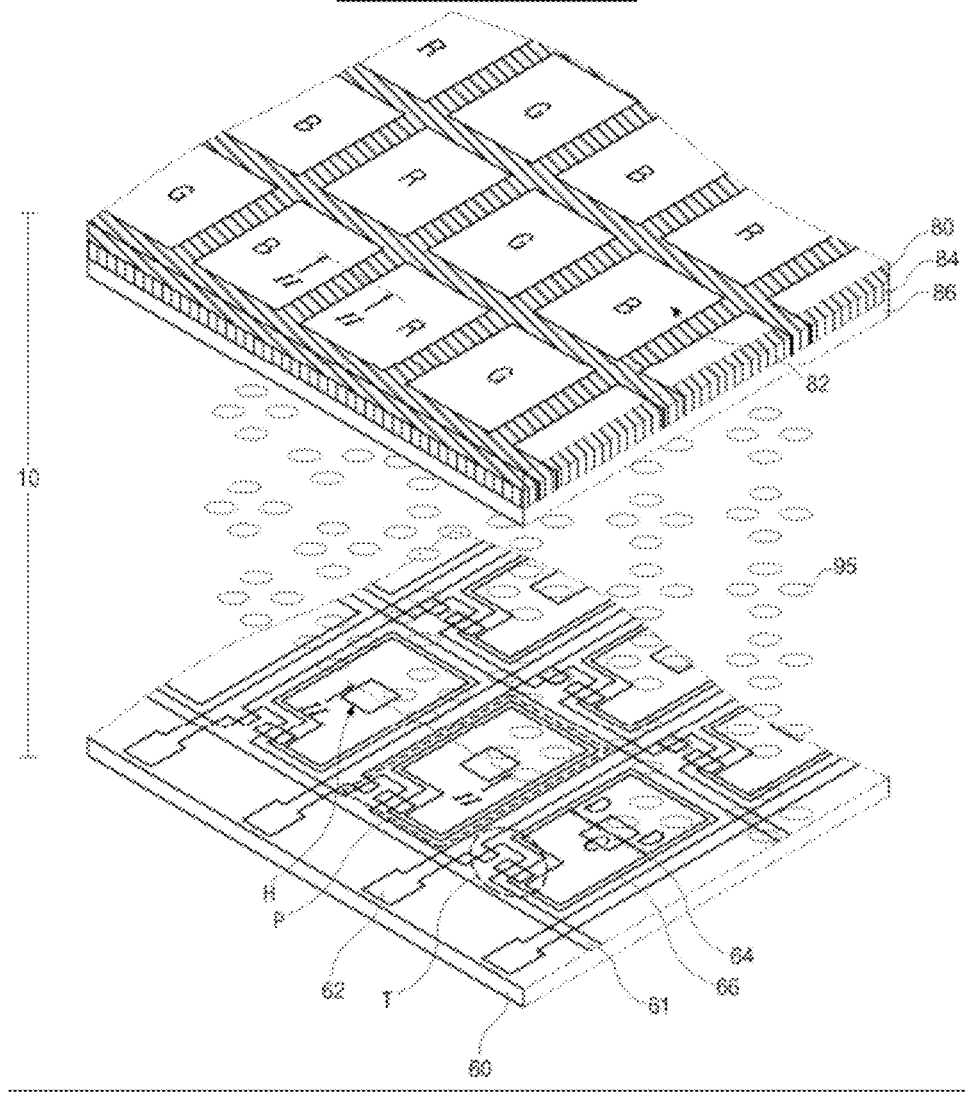
FIG. 1 is an exploded perspective view of a liquid crystal display (LCD) device according to the related art.
Figure 2:
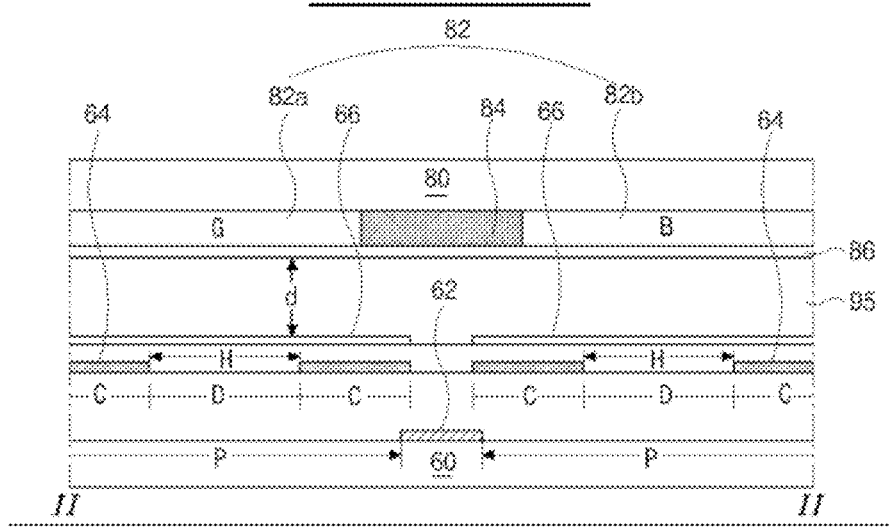
FIG. 2 is a schematic cross-sectional view, which is taken along a line "II-II" of FIG. 1, showing a transflective liquid crystal display device according to a first embodiment of the related art.
Figure 3:
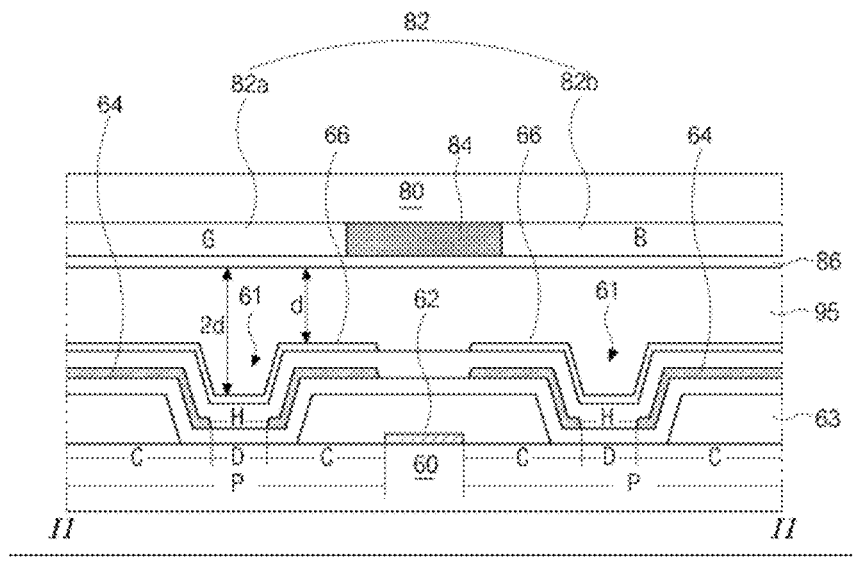
FIG. 3 is a schematic cross-sectional view, which is taken along a line "II-II" of FIG. 1, showing a transflective liquid crystal display device according to a second embodiment of the related art.
Figure 4:
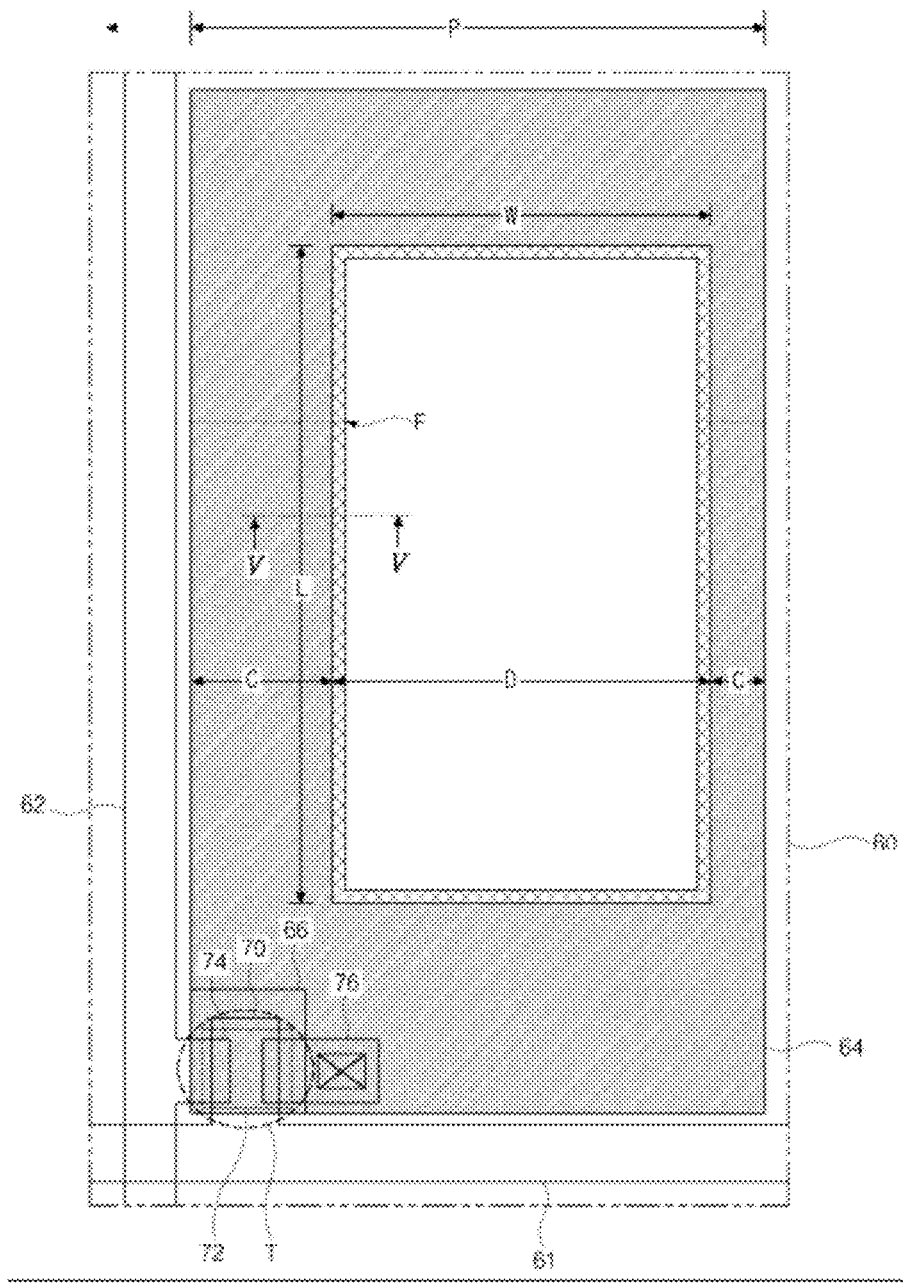
FIG. 4 is a schematic plane view showing a pixel region of an array substrate for a transflective liquid crystal display device according to a second embodiment of the related art.
Figure 5:
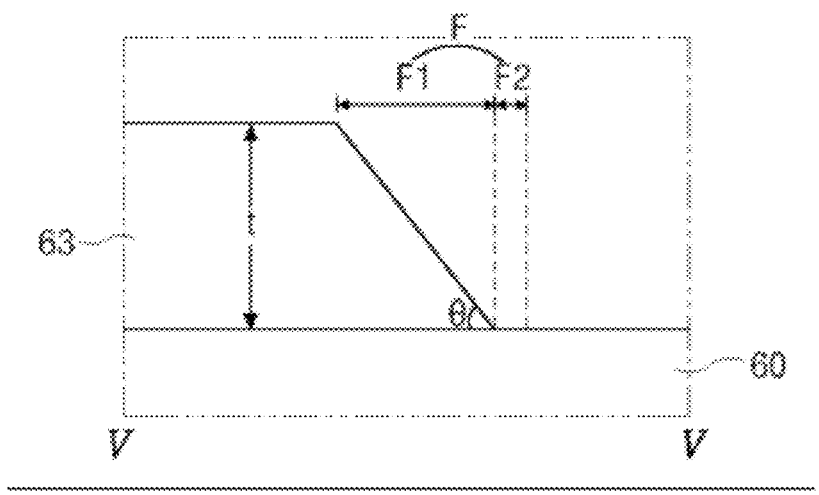
FIG. 5 is a schematic cross-sectional view taken along a line "V-V" of FIG. 4.

As in the related art, a step is generated at a border region "F" of the reflective and transmissive portions "C" and "D" and may cause an incline. However, because the transmissive portion "D" has a triangular shape instead of rectangular shape, a total area of the border region "F" may be reduced. Even though a width of the border region "F" of FIG. 6 is similar to that of FIG. 4, the total length "K+L+W" of sides of the transmissive portion "D" is shorter than that "2×(L+W)" of transmissive portion of FIG. 4. Accordingly, the total area of the border region "F" is reduced and disclination is improved. As a result, aperture ratio and contrast ratio are also improved.

Figure 7:
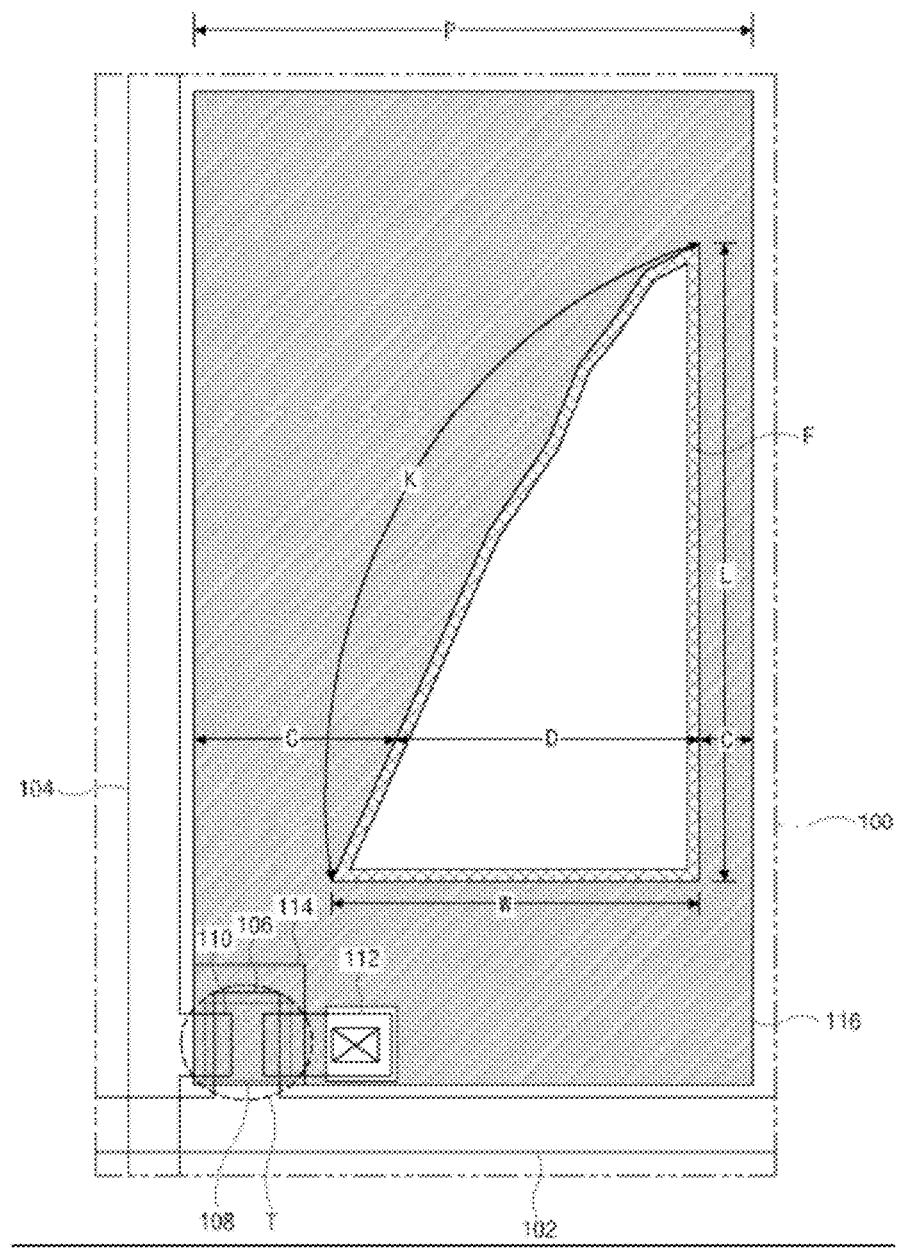
FIG. 7 is a schematic plane view showing a pixel region of an array substrate for a transflective liquid crystal display device according to a second embodiment of the present invention.

FIG. 7 is a schematic plane view showing a pixel region of an array substrate for a transflective liquid crystal display device according to a second embodiment of the present invention.

In FIG. 7, a gate line 102 is formed on a substrate 100 and a data line 104 crosses the gate line 102 to define a pixel region "P." A thin film transistor (TFT) "T" including a gate electrode 106 connected to the gate line 102, an active layer 108, a source electrode 110 connected to the data line 104 and a drain electrode 112. The source and drain electrodes 110 and 112 are spaced apart from each other. The pixel region "P" includes a reflective portion "C" and a transmissive portion "D." A transparent electrode 114 is formed to correspond to the pixel region "P" and a reflective layer 116 is formed to correspond to the reflective portion "C."

As in the related art, a step is generated at a border region "F" of the reflective and transmissive portions "C" and "D" and may cause an incline. To increase ratio of the transmissive portion "D," one side of the transmissive portion "D" has a winding portion. Accordingly, the total area of the border region "F" of the second embodiment is larger than that of the first embodiment. However, because the total area of the border region "F" of the second embodiment is still smaller than that of the border region "F" of FIG. 4, the incline is improved. As a result, aperture ratio and contrast ratio are improved.

Figure 8:
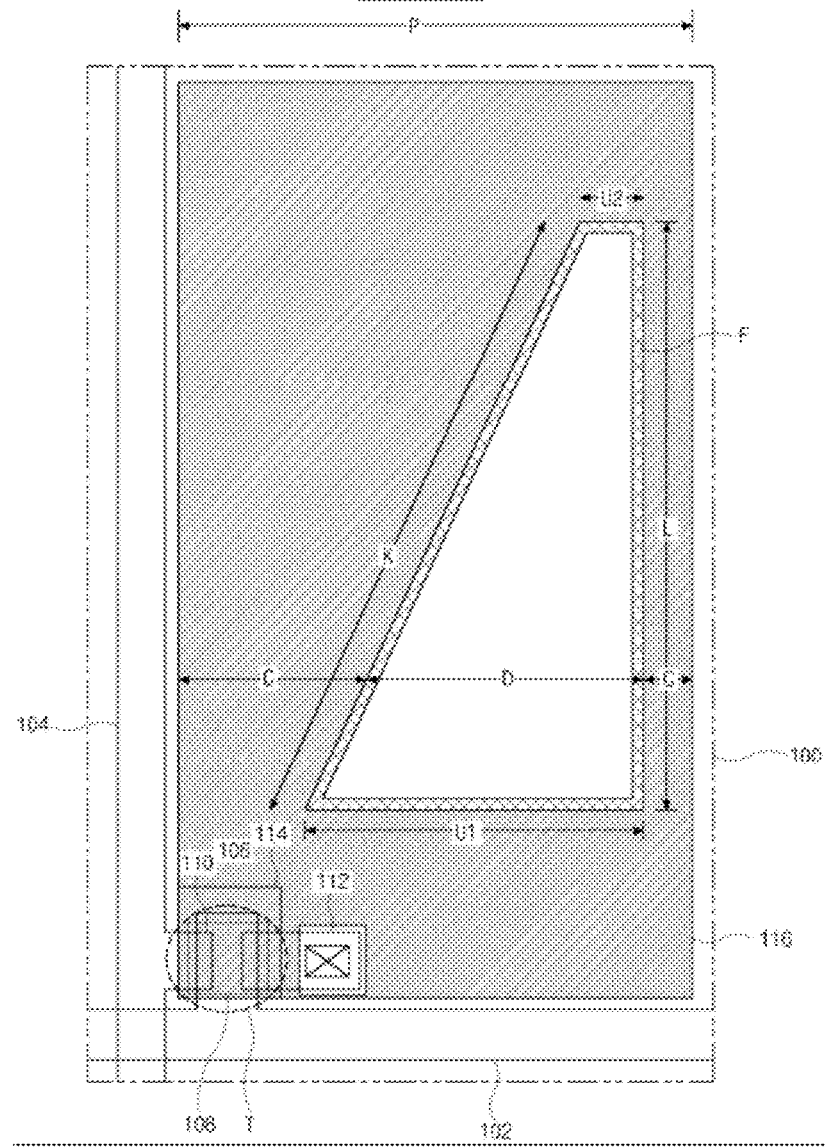
FIG. 8 is a schematic plane view showing a pixel region of an array substrate for a transflective liquid crystal display device according to a third embodiment of the present invention.

FIG. 8 is a schematic plane view showing a pixel region of an array substrate for a transflective liquid crystal display device according to a third embodiment of the present invention.

In FIG. 8, a gate line 102 is formed on a substrate 100 and a data line 104 crosses the gate line 102 to define a pixel region "P." A thin film transistor (TFT) "T" including a gate electrode 106, an active layer 108, a source electrode 110 and a drain electrode 112 is connected to the gate line 102 and the data line 104. The gate electrode 106 and the source electrode 110 are connected to the gate line 102 and the data line 104, respectively. The source and drain electrodes 110 and 112 are spaced apart from each other. The pixel region "P" includes a reflective portion "C" and a transmissive portion "D." A transparent electrode 114 is formed to correspond to the pixel region "P" and a reflective layer 116 is formed to correspond to the reflective portion "C."

As in the related art, a step is generated at a border region "F" of the reflective and transmissive portions "C" and "D," and may create an incline. To increase the ratio of the transmissive portion "D" to the pixel region "P," the transmissive portion "D" is formed to have a trapezoid shape. Accordingly, a total area of the border region "F" of the third embodiment is larger than that of the first embodiment. However, because the total area of the border region "F" of the second embodiment is still smaller than that of the border region "F" of FIG. 4, the incline area is reduced. As a result, aperture ratio and contrast ratio are improved.

In the first to third embodiments of the present invention, even though the incline area is reduced, the ratio of the transmissive portion to the pixel region also reduced. As a result, the brightness of the transmissive mode may be sacrificed or a backlight unit with increased brightness may be used. To solve these problems, other embodiments are illustrated.

Figure 9:
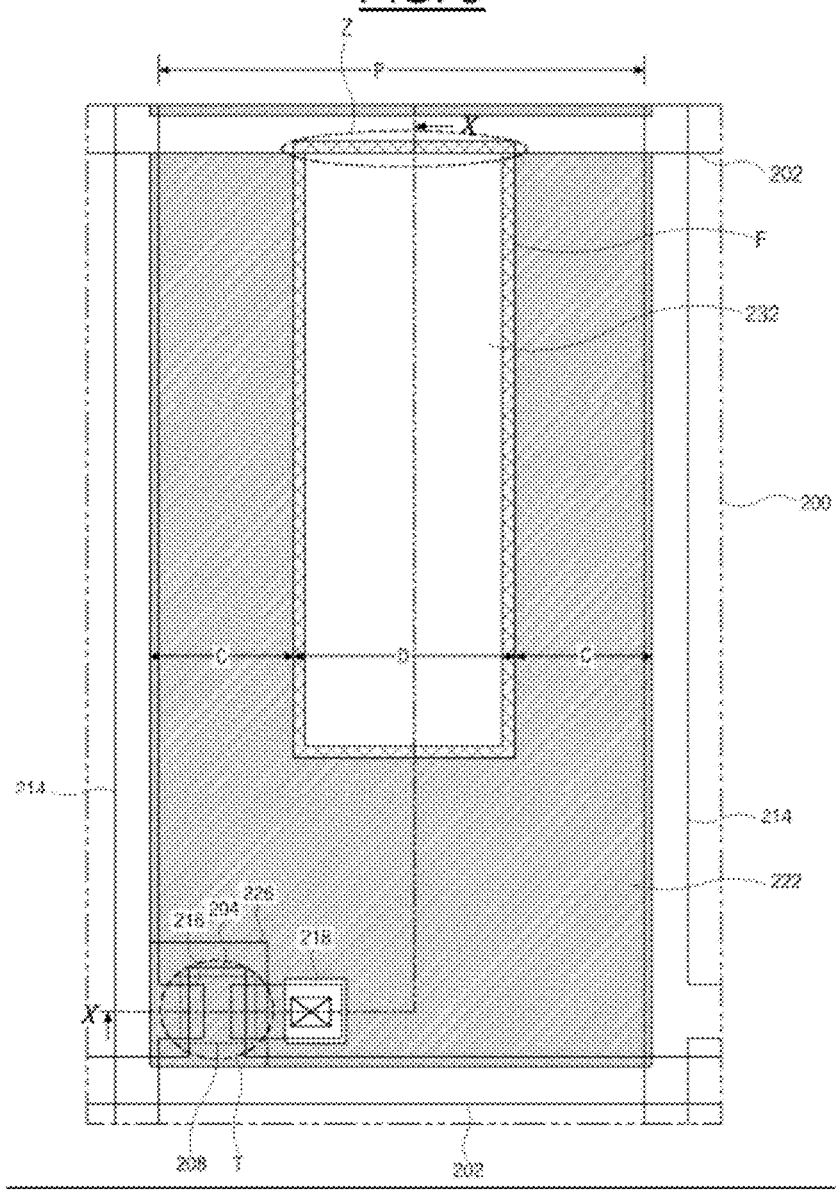
FIG. 9 is a schematic plane view showing a pixel region of an array substrate for a transflective liquid crystal display device according to a fourth embodiment of the present invention.

FIG. 9 is a schematic plane view showing a pixel region of an array substrate for a transflective liquid crystal display device according to a fourth embodiment of the present invention.

In FIG. 9, a gate line 202 is formed on a substrate 200 and a data line 214 crosses the gate line 202 to define a pixel region "P." A thin film transistor (TFT) "T" including a gate electrode 204, an active layer 208, a source electrode 216 and a drain electrode 218. The gate electrode 204 and the source electrode 216 are connected to the gate line 202 and the data line 214, respectively. The source and drain electrodes 216 and 218 are spaced apart from each other. The pixel region "P" includes a reflective portion "C" and a transmissive portion "D." A transparent electrode 226 is formed to correspond to the pixel region "P" and a reflective layer 222 is formed to correspond to the reflective portion "C."

As in the related art, a step is generated at a border region "F" between the reflective and transmissive portions "C" and "D," and may create an incline. However, because one side "Z" of the border region "F" overlaps the gate line 202, light from a backlight unit (not shown) does not enter the one side "Z" of the border region "F" but is shielded by the gate line 202. Accordingly, a total area of the border region "F" is substantially reduced. As a result, aperture ratio and contrast ratio are improved.

Even though a border region "F" as shown in FIG. 9 overlaps an upper gate line 202 adjacent to upper neighboring pixel region "P" in the fourth embodiment, the border region may also be formed to overlap the lower gate line adjacent to the lower neighboring pixel region in another embodiment.

Figure 10:
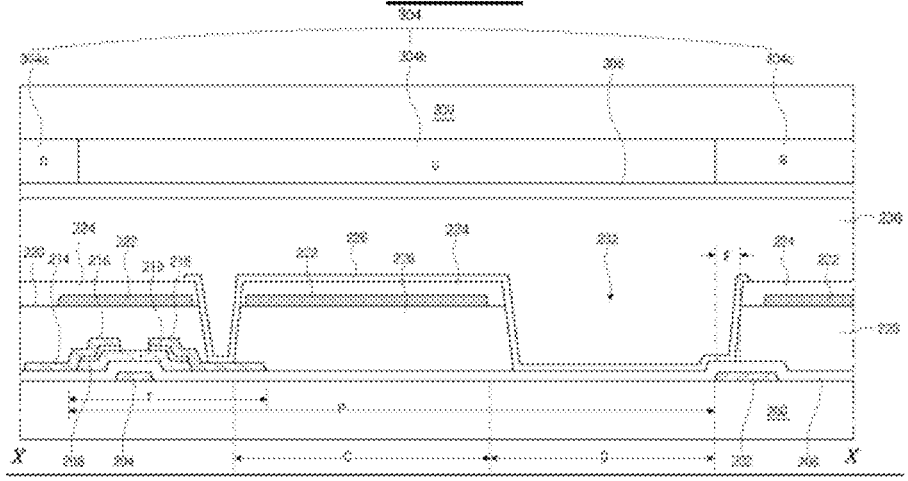
FIG. 10 is a schematic cross-sectional view, which corresponds to a line "X-X" of FIG. 9, showing a transflective liquid crystal display device according to a fifth embodiment of the present invention.

FIG. 10 is a schematic cross-sectional view, which corresponds to a line "X-X" of FIG. 9, showing a transflective liquid crystal display device according to a fifth embodiment of the present invention.

In FIG. 10, first and second substrates 200 and 300 having a plurality of pixel regions "P" face and are spaced apart from each other, and a liquid crystal layer 230 is interposed therebetween. A color filter layer 304 is formed on an inner surface of the second substrate 300 and a common electrode 306 is formed on the color filter layer 304. The color filter layer 304 includes red, green and blue sub-color filters 304a, 304b, and 304c, respectively corresponding to pixel region "P." A gate line 202 is formed on an inner surface of the first substrate 200 and a gate insulating layer 206 is formed on the gate line 202. A data line 214 crossing the gate line 202 is formed on the gate insulating layer 206. A thin film transistor (TFT) "T" including a gate electrode 204 connected to the gate line 102, an active layer 208, an ohmic contact layer 210, a source electrode 216 connected to the data line 214, and a drain electrode 218. A first passivation layer 220 is formed over the TFT "T." The first passivation layer 220 may be formed of an organic material including benzocyclobutene (BCB) and acrylic resin.

The pixel region "P" includes a reflective portion "C" and a transmissive portion "D." A reflective layer 222 is formed on the first passivation layer 220 to correspond to the reflective portion "C" and a second passivation layer 224 is formed on the reflective layer 222. A transparent electrode 226 is formed on the second passivation layer 224 to correspond to the pixel region "P." Even though only the transparent electrode 226 is connected to the drain electrode 218 in the fifth embodiment shown in FIG. 10, both of the transparent electrode 226 and the reflective layer 222 also may be electrically connected to the drain electrode 218 in another embodiment.

The first passivation layer 220 has a opening 232 corresponding to the transmissive portion "D." The opening 232 is disposed such that one side of the opening 232 overlaps the gate line 202. In other words, because one side of a border region "F" having a step overlaps the gate line 202, light from a backlight unit (not shown) is shielded by the gate line 202 and can not pass through the one side of the border region "F." Accordingly, incline area is reduced, and aperture ratio and contrast ratio are improved. While the opening 232 is formed, the gate insulating layer 206 remains so that the gate line 202 can not be exposed and can not contact the reflective layer 222 in a subsequent process.

In the fifth embodiment, a opening is formed in the passivation layer 220 on the first substrate to obtain an equivalent optical efficiency in the reflective and transmissive portions. Generally, several coating steps are necessary to obtain a sufficient thickness of the passivation layer. To reduce these steps, a structure where the opening is formed in a layer on a second substrate passivation layer is illustrated.

Figure 11:
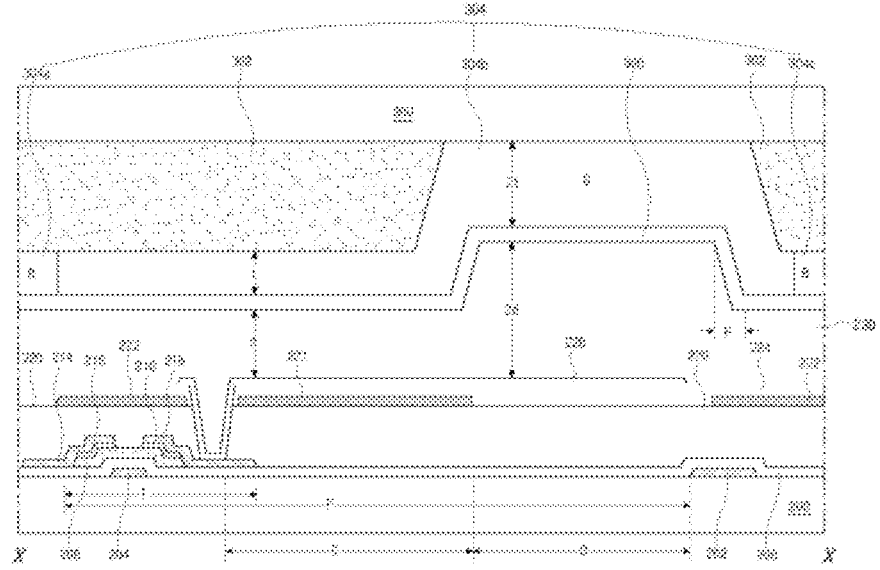
FIG. 11 is a schematic cross-sectional view, which corresponds to a line "X-X" of FIG. 9, showing a transflective liquid crystal display device according to a sixth embodiment of the present invention.

FIG. 11 is a schematic cross-sectional view, which corresponds to a line "X-X" of FIG. 9, showing a transflective liquid crystal display device according to a sixth embodiment of the present invention.

In FIG. 11, first and second substrates 200 and 300 having a plurality of pixel regions "P" face and are spaced apart from each other, and a liquid crystal layer 230 is interposed therebetween. A gate line 202 is formed on an inner surface of the first substrate 200 and a gate insulating layer 206 is formed on the gate line 202. A data line 214 crossing the gate line 202 is formed on the gate insulating layer 206. A thin film transistor (TFT) "T" including a gate electrode 204 connected to the gate line 202, an active layer 208, an ohmic contact layer 210, a source electrode 216 connected to the data line 214 and a drain electrode 218. A first passivation layer 220 is formed over the TFT "T." The first passivation layer 220 may be formed of an organic material including benzocyclobutene (BCB) and acrylic resin.

The pixel region "P" includes a reflective portion "C" and a transmissive portion "D." A reflective layer 222 is formed on the first passivation layer 220 to correspond to the reflective portion "C" and a second passivation layer 224 is formed on the reflective layer 222. A transparent electrode 226 is formed on the second passivation layer 224 corresponding to the pixel region "P." Even though only the transparent electrode 226 is connected to the drain electrode 218 in the sixth embodiment, both of the transparent electrode 226 and the reflective layer 222 also may be electrically connected to the drain electrode 218 in another embodiment.

A transparent buffer layer 302 is formed on an inner surface of the second substrate 300 to correspond to the reflective portion "C" and a color filter layer 304 is formed on the buffer layer 302. The color filter layer 304 includes red, green, and blue sub-color filters 304a, 304b, and 304c respectively corresponding to the pixel region "P." The color filter layer 304 is formed to have a thickness ratio of 2t:t in the transmissive portion "D" versus the reflective portion "C" due to the buffer layer 302. Moreover, the liquid crystal layer 230 is formed to have a thickness ratio of 2d:d in the transmissive portion "D" versus the reflective portion "C" due to the buffer layer 302. Accordingly, an equivalent optical efficiency is obtained in the reflective and transmissive portions "C" and "D" due to the thickness ratio of the liquid crystal layer 230. Furthermore, an equivalent color is obtained in the reflective and transmissive portions "C" and "D" due to the thickness ratio of the color filter layer 304. A common electrode 306 is formed on the color filter layer 304.

In a sixth embodiment, a step is generated in the color filter layer 304 at a border region "F" of the reflective and transmissive portions "C" and "D," and the step creates an incline. However, because one side of a border region "F" overlaps the gate line 202, the incline region is reduced. In other words, because one side of a border region "F" having a step overlaps the gate line 202, light from a backlight unit (not shown) is shielded by the gate line 202 and can not pass through the one side of the border region "F." Accordingly, the incline region is reduced, and aperture ratio and contrast ratio are improved.

Figure 12:
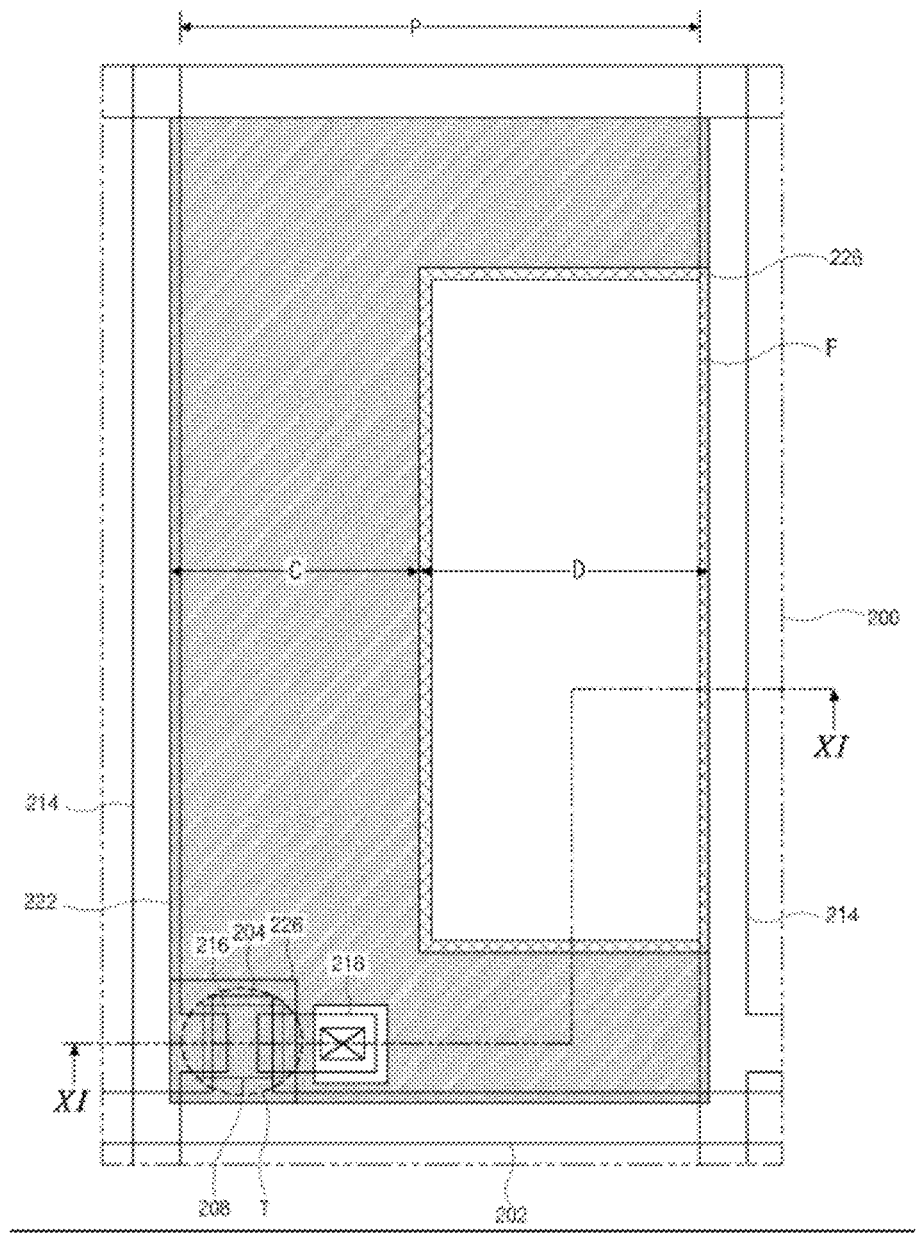
FIG. 12 is a schematic plane view showing a pixel region of an array substrate for a transflective liquid crystal display device according to a seventh embodiment of the present invention.

FIG. 12 is a schematic plane view showing a pixel region of an array substrate for a transflective liquid crystal display device according to a seventh embodiment of the present invention.

In FIG. 12, a gate line 202 is formed on a substrate 200 and a data line 214 crosses the gate line 202 to define a pixel region "P." A thin film transistor (TFT) "T" including a gate electrode 204, an active layer 208, a source electrode 216 and a drain electrode 218. The gate electrode 204 and the source electrode 216 are connected to the gate line 202 and the data line 214, respectively. The source and drain electrodes 216 and 218 are spaced apart from each other. The pixel region "P" includes a reflective portion "C" and a transmissive portion "D." A transparent electrode 226 is formed to correspond to the pixel region "P" and a reflective layer 222 is formed to correspond to the reflective portion "C."

A step is generated at a border region "F" of the reflective and transmissive portions "C" and "D," and may cause an incline. However, because one side of the border region "F" overlaps the data line 214, light from a backlight unit (not shown) does not enter the one side "Z" of the border region "F" but is shielded by the data line 214. Accordingly, the total area of the border region "F" causing an incline is substantially reduced. As a result, aperture ratio and contrast ratio are improved.

Figure 13:
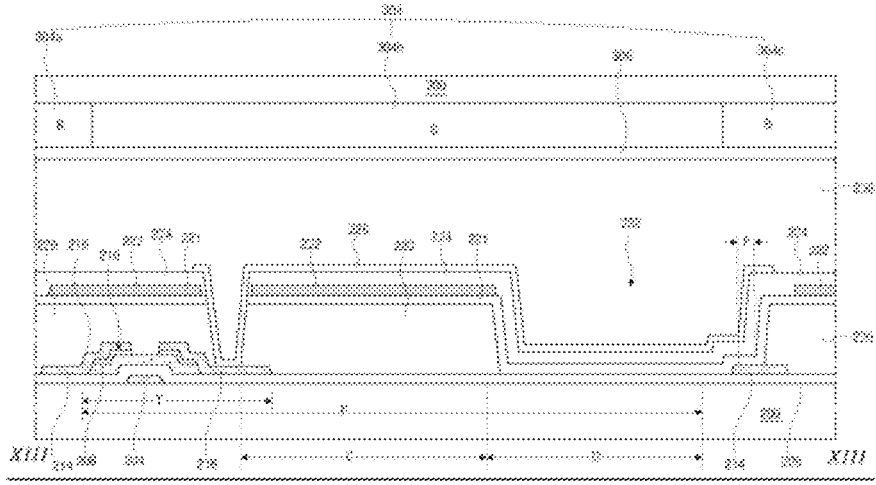
FIG. 13 is a schematic cross-sectional view, which corresponds to a line "XIII-XIII" of FIG. 12, showing a transflective liquid crystal display device according to a eighth embodiment of the present invention.

FIG. 13 is a schematic cross-sectional view, which corresponds to a line "XIII-XIII" of FIG. 12, showing a transflective liquid crystal display device according to a eighth embodiment of the present invention.

In FIG. 13, first and second substrates 200 and 300 having a plurality of pixel regions "P" face and are spaced apart from each other, and a liquid crystal layer 230 is interposed therebetween. A color filter layer 304 is formed on an inner surface of the second substrate 300 and a common electrode 306 is formed on the color filter layer 304. The color filter layer 304 includes red, green, and blue sub-color filters 304a, 304b, and 304c respectively corresponding to pixel region "P." A gate line (not shown) is formed on an inner surface of the first substrate 200 and a gate insulating layer 206 is formed on the gate line. A data line 214 crossing the gate line is formed on the gate insulating layer 206. A thin film transistor (TFT) "T" including a gate electrode 204 connected to the gate line, an active layer 208, an ohmic contact layer 210, a source electrode 216 connected to the data line 214 and a drain electrode 218.

A first passivation layer 220 is formed over the TFT "T." The first passivation layer 220 may be formed of an organic material including benzocyclobutene (BCB) and acrylic resin. The first passivation layer 220 has a opening 232 corresponding to the transmissive portion "D." The opening 232 is disposed such that one side of the opening 232 overlaps the data line 214. Because the data line 214 is exposed by the opening 232, a second passivation layer 221 is formed on the first passivation layer 220 to cover the data line 214. The second passivation layer 221 may be formed of an organic material including benzocyclobutene (BCB) and acrylic resin or an inorganic material including silicon nitride ($SiN_x$) and silicon oxide ($SiO_2$).

The pixel region "P" includes a reflective portion "C" and a transmissive portion "D." A reflective layer 222 is formed on the second passivation layer 221 to correspond to the reflective portion "C" and a third passivation layer 224 is formed on the reflective layer 222. A transparent electrode 226 is formed on the third passivation layer 224 to correspond to the pixel region "P."

In the eighth embodiment, a step is generated in a first passivation layer 220 on the first substrate 200 and the data line 214 is exposed by a opening of the first passivation layer 220. To prevent an electrical shortage of the data line 214 with the reflective layer 222 or the transparent electrode 226, the second passivation layer 221 is formed on the first passivation layer 220 to cover the exposed data line 214.

Because one side of a border region "F" having a step overlaps the data line 214, light from a backlight unit (not shown) is shielded by the data line 214 and can not pass through the one side of the border region "F." Accordingly, the incline region is reduced, and aperture ratio and contrast ratio are improved.

Figure 14:
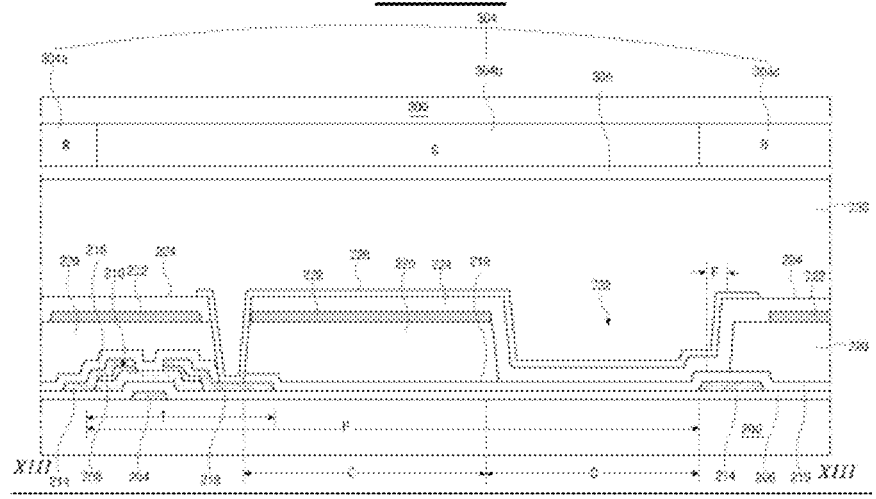
FIG. 14 is a schematic cross-sectional view, which corresponds to a line "XIII-XIII" of FIG. 12, showing a transflective liquid crystal display device according to a ninth embodiment of the present invention.

FIG. 14 is a schematic cross-sectional view, which corresponds to a line "XIII-XIII" of FIG. 12, showing a transflective liquid crystal display device according to a ninth embodiment of the present invention.

In FIG. 14, first and second substrates 200 and 300 having a plurality of pixel regions "P" face and are spaced apart from each other, and a liquid crystal layer 230 is interposed therebetween. A color filter layer 304 is formed on an inner surface of the second substrate 300 and a common electrode 306 is formed on the color filter layer 304. The color filter layer 304 includes red, green, and blue sub-color filters 304a, 304b, and 304c respectively corresponding to pixel region "P." A gate line (not shown) is formed on an inner surface of the first substrate 200 and a gate insulating layer 206 is formed on the gate line. A data line 214 crossing the gate line is formed on the gate insulating layer 206. A thin film transistor (TFT) "T" including a gate electrode 204 connected to the gate line, an active layer 208, an ohmic contact layer 210, a source electrode 216 connected to the data line 214, and a drain electrode 218.

A first passivation layer 219 is formed over the TFT "T." The first passivation layer 219 may be formed of an inorganic material including silicon nitride ($SiN_x$) and silicon oxide ($SiO_2$). A second passivation layer 220 is formed on the first passivation layer 219. The second passivation layer 220 may be formed of an organic material including benzocyclobutene (BCB) and acrylic resin. The second passivation layer 220 has a opening 232 corresponding to the transmissive portion "D." The opening 232 is disposed such that one side of the opening 232 overlaps the data line 214. Since the opening 232 is formed in the second passivation layer 220, the first passivation layer 219 remains on the data line 214. Accordingly, the data line 214 is not exposed by the opening 232 but covered with the first passivation layer 219. As a result, an electrical shortage of the data line 214 with the reflective layer 222 or the transparent electrode 226 in a subsequent process is prevented by forming the first passivation layer 219 between the data line 214 and the second passivation layer 220 having the opening 232.

The pixel region "P" includes a reflective portion "C" and a transmissive portion "D." A reflective layer 222 is formed on the second passivation layer 220 to correspond to the reflective portion "C" and a third passivation layer 224 is formed on the reflective layer 222. A transparent electrode 226 is formed on the third passivation layer 224 to correspond to the pixel region "P."

In the ninth embodiment, a step is generated in a second passivation layer 220 on the first substrate 200. However, because one side of a border region "F" having a step overlaps the data line 214, light from a backlight unit (not shown) is shielded by the data line 214 and can not pass through the one side of the border region "F." Accordingly, the incline area is reduced, and aperture ratio and contrast ratio are improved.

Figure 15:
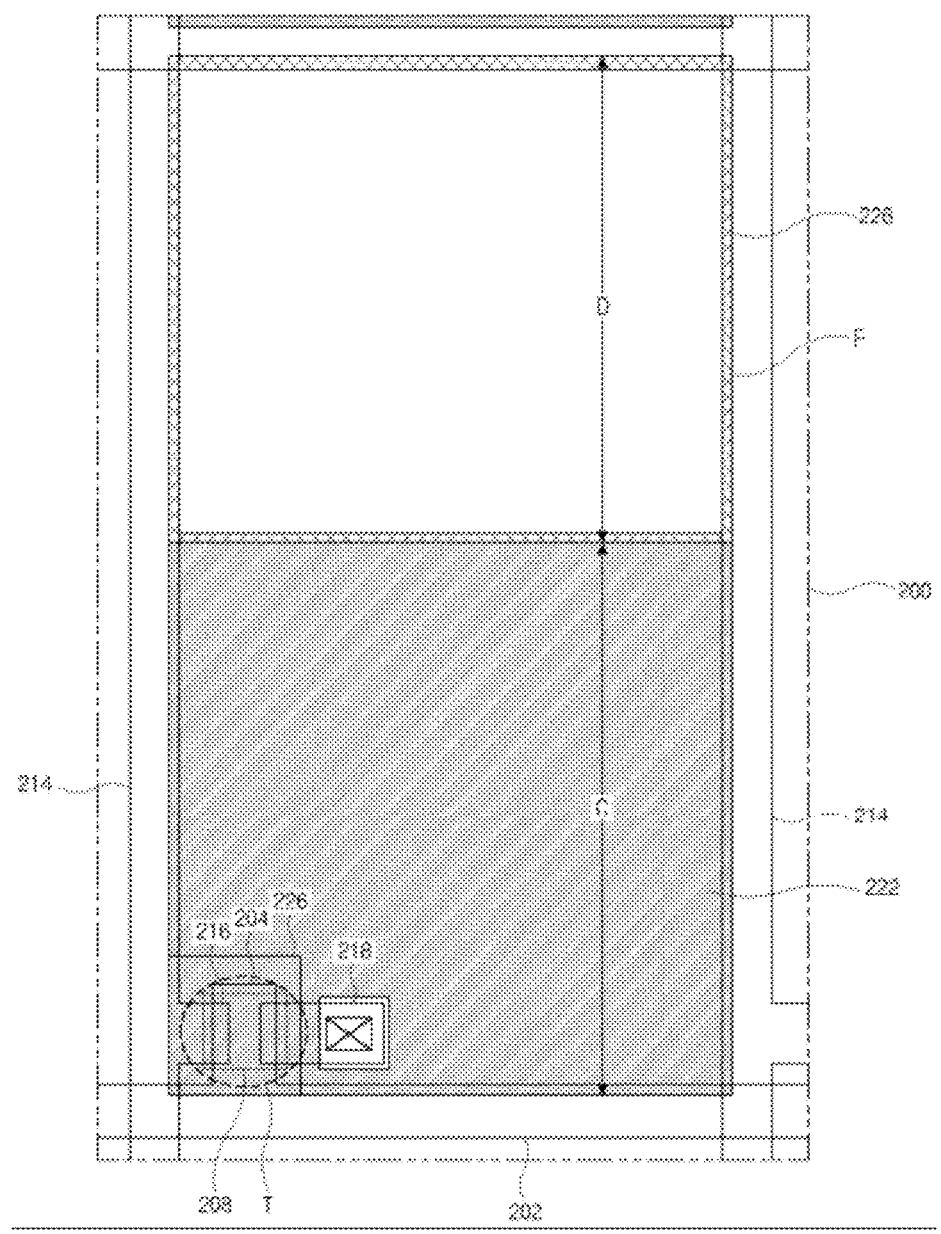
FIG. 15 is a schematic cross-sectional view showing a pixel region of an array substrate for a transflective liquid crystal display device according to a tenth embodiment of the present invention.
Figure 16:
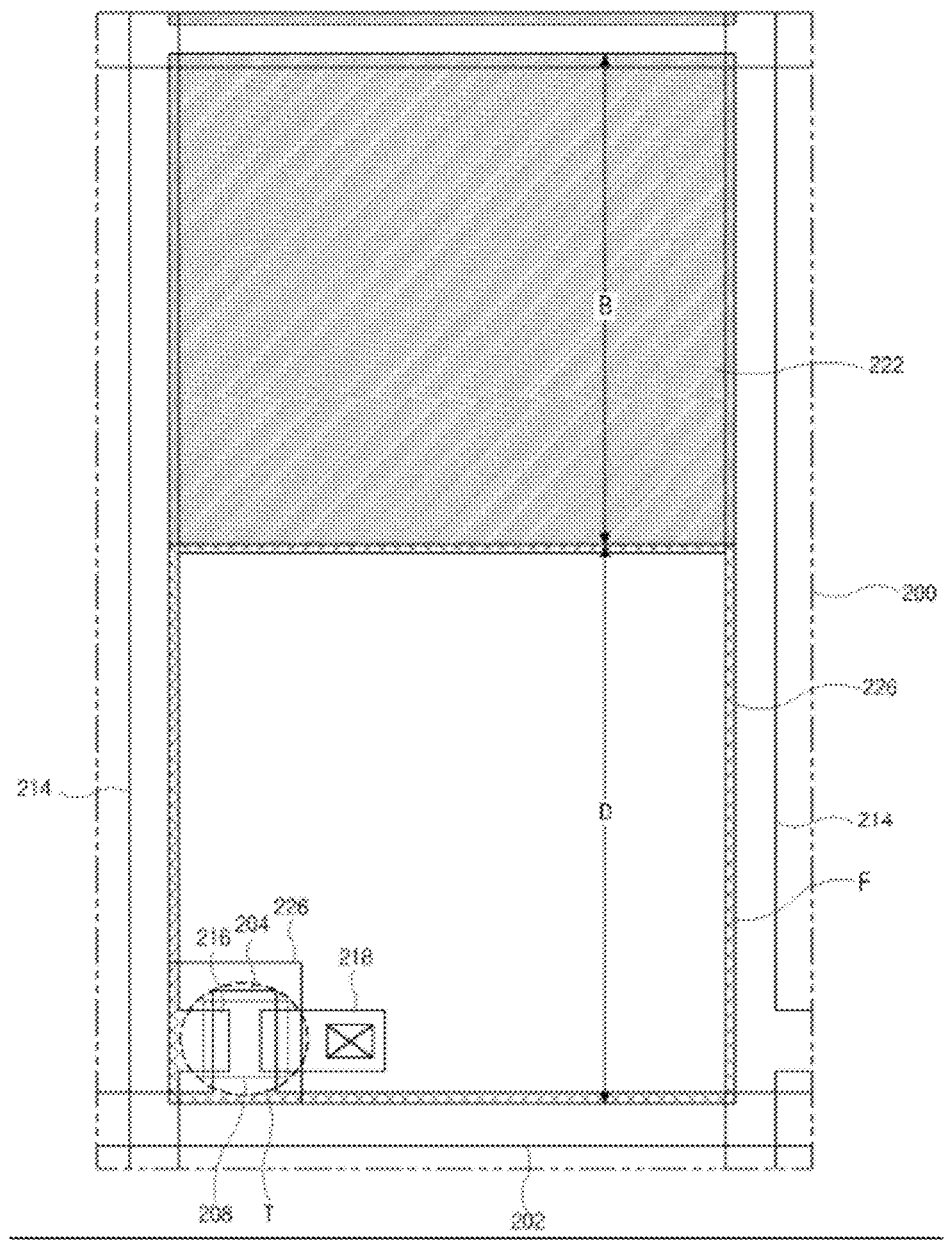
FIG. 16 is a schematic cross-sectional view showing a pixel region of an array substrate for a transflective liquid crystal display device according to an eleventh embodiment of the present invention.

FIG. 15 is a schematic cross-sectional view showing a pixel region of an array substrate for a transflective liquid crystal display device according to tenth embodiment of the present invention and FIG. 16 is a schematic cross-sectional view showing a pixel region of an array substrate for a transflective liquid crystal display device according to eleventh embodiment of the present invention.

In FIGS. 15 and 16, a gate line 202 is formed on a substrate 200 and a data line 214 crosses the gate line 202 to define a pixel region "P." A thin film transistor (TFT) "T" including a gate electrode 204, an active layer 208, a source electrode 216 and a drain electrode 218. The gate electrode 204 and the source electrode 216 are connected to the gate line 202 and the data line 214, respectively. The source and drain electrodes 216 and 218 are spaced apart from each other. The pixel region "P" includes a reflective portion "C" and a transmissive portion "D." A transparent electrode 226 is formed to correspond to the pixel region "P" and a reflective layer 222 is formed to correspond to the reflective portion "C." To form the reflective and transmissive portions "C" and "D," a passivation layer having a opening corresponding to the transmissive portion "D" may be formed on a first substrate or a buffer layer corresponding to the reflective layer "C" may be formed on a second substrate. The reflective portion "C" is disposed at a lower portion of the pixel region "P" in FIG. 15, while the reflective portion "C" is disposed at an upper portion of the pixel region "P" in FIG. 16.

A step is generated at a border region "F" of the reflective and transmissive portions "C" and "D," and may cause an incline. However, because one side of the border region "F" overlaps the gate line 202 and two sides of the border region "F" overlap the data line 214, light from a backlight unit (not shown) does not enter the three sides overlapping the gate line 202 or the data line 214 but is shielded by the gate line 202 or data line 214. Accordingly, the total area of the border region "F" causing an incline is substantially reduced. As a result, aperture ratio and contrast ratio are improved.

FIG. 17 is a schematic cross-sectional view showing a pixel region of an array substrate for a transflective liquid crystal display device according to twelfth embodiment of the present invention and FIG. 18 is a schematic cross-sectional view showing a pixel region of an array substrate for a transflective liquid crystal display device according to thirteenth embodiment of the present invention.

In FIGS. 17 and 18, a gate line 202 is formed on a substrate 200 and a data line 214 crosses the gate line 202 to define a pixel region "P." A thin film transistor (TFT) "T" including a gate electrode 204, an active layer 208, a source electrode 216 and a drain electrode 218. The gate electrode 204 and the source electrode 216 are connected to the gate line 202 and the data line 214, respectively. The source and drain electrodes 216 and 218 are spaced apart from each other. The pixel region "P" includes a reflective portion "C" and a transmissive portion "D." A transparent electrode 226 is formed to correspond to the pixel region "P" and a reflective layer 222 is formed to correspond to the reflective portion "C." To form the reflective and transmissive portions "C" and "D," a passivation layer having a opening corresponding to the transmissive portion "D" may be formed on a first substrate or a buffer layer corresponding to the reflective layer "C" may be formed on a second substrate. The reflective portion "C" is disposed at a left portion of the pixel region "P" in FIG. 17, while the reflective portion "C" is disposed at a right portion of the pixel region "P" in FIG. 18.

A step is generated at a border region "F" of the reflective and transmissive portions "C" and "D," and may cause an incline. However, because two sides of the border region "F" overlap the gate line 202 and one side of the border region "F" overlaps the data line 214, light from a backlight unit (not shown) does not enter the three sides overlapping the gate line 202 or the data line 214 but is shielded by the gate line 202 or data line 214. Accordingly, the total area of the border region "F" causing an incline is substantially reduced. As a result, aperture ratio and contrast ratio are improved.

Consequently, a transflective liquid crystal display device of the present invention includes a liquid crystal layer having a cell gap ratio of 2:1 in transmissive and reflective portions and a color filter layer having a thickness ratio of 2:1 in transmissive and reflective portions with reduced inclination. Accordingly, high brightness and high contrast ratio are obtained due to improved aperture ratio.

It will be apparent to those skilled in the art that various modifications and variations can be made in a transflective liquid crystal display device and a fabricating method thereof of the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device, comprising:
    first and second substrates facing and spaced apart from each other;
    a gate line on an inner surface of the first substrate;
    a data line crossing the gate line to define a pixel region including a reflective portion and a transmissive portion;
    a thin film transistor connected to the gate line and the data line;
    a passivation layer on the thin film transistor, the passivation layer having a opening corresponding to the transmissive portion;
    a reflective layer corresponding to the reflective portion on the passivation layer;
    a transparent electrode corresponding to the pixel region over the reflective layer;
    a color filter layer on an inner surface of the second substrate;
    a common electrode on the color filter layer; and
    a liquid crystal layer between the common electrode and the transparent electrode wherein the transmissive portion has a right-angled triangular shape.

2. The device according to claim 1, wherein the thin film transistor includes a gate electrode connected to the gate line, an active layer, a source electrode connected to the data line and a drain electrode connected to the transparent electrode.

3. The device according to claim 1, wherein the thickness of the liquid crystal layer in the reflective portion versus the transmissive portion has a ratio of about 1:2.

4. A transflective liquid crystal display device, comprising:
    first and second substrates facing and spaced apart from each other;
    a gate line on an inner surface of the first substrate;
    a data line crossing the gate line to define a pixel region including a reflective portion and a transmissive portion;
    a thin film transistor connected to the gate line and the data line;
    a passivation layer on the thin film transistor;
    a reflective layer corresponding to the reflective portion on the passivation layer;
    a transparent electrode corresponding to the pixel region over the reflective layer;
    a buffer layer corresponding to the reflective portion on an inner surface of the second substrate;
    a color filter layer on the buffer layer;
    a common electrode on the color filter layer; and
    a liquid crystal layer between the common electrode and the transparent electrode, wherein the transmissive portion has a right-angled triangular shape.

5. The device according to claim 4, wherein the thin film transistor includes a gate electrode connected to the gate line, an active layer, a source electrode connected to the data line and a drain electrode connected to the transparent electrode.

6. The device according to claim 4, wherein the thickness of the liquid crystal layer in the reflective portion versus the transmissive portion has a ratio of about 1:2.

7. The device according to claim 4, wherein the thickness of the color filter layer in the reflective portion versus the transmissive portion has a ratio of about 1:2.

* * * * *